HEAT-SEALABLE MOISTUREPROOF WRAPPING MATERIAL

Cyril Howard Phillips, James Charles Brunton, and Geoffrey Downing Pearce, Bridgwater, England, assignors to British Cellophane Limited, Bridgwater, England
No Drawing. Filed Mar. 12, 1970, Ser. No. 19,095
Claims priority, application Great Britain, Mar. 13, 1969, 13,278/69
Int. Cl. B44d 1/02; B32b 23/08, 27/08
U.S. Cl. 117—68.5
9 Claims

ABSTRACT OF THE DISCLOSURE

The invention relates to heat-sealable moistureproof sheet materials. A base sheet is coated on each side with a sub-coating of a vinylidene chloride copolymer having a vinylidene chloride content of from 93 to 96% by weight and having a sum total weight of coating on both sides of the sheet of from 2.0 to 10.0 grams per square metre. The sub-coating is overlain with a top coating comprising a vinylidene chloride copolymer having a vinylidene chloride content of from 80 to 92% by weight and having a sum total weight of top coating on both sides of the sheet of from 1.0 to 5.0 grams per square metre. The sheet materials are useful as wrapping materials.

---

This invention relates to heat-sealable moistureproof wrapping material and in particular to sheets and films coated with a vinylidene chloride copolymer coating composition.

It is well-known to coat films of cellulosic materials such as regenerated cellulose film and plastics materials such as polypropylene with a vinylidene chloride copolymer coating composition applied from aqueous dispersions in order to render the films moistureproof and heat-sealable. The higher the vinylidene chloride content in the copolymer, for a particular choice of comonomer or comonomers, the lower the water vapour permeability of the coating.

However, copolymer coatings having high vinylidene chloride content have heat-seal temperatures (hereinafter defined) which are undesirably high and tend to give unsatisfactory heat-seals particularly when the coated wrapping material is converted into bags or other wrappers having heat-seals upon high speed packaging machinery in which short dwell times and low sealing pressures occur. Further, it is necessary to incorporate surface effect additives into the copolymer coatings to provide optimum machinability of the coated material, that is, additives which improve slip, anti-blocking and electrostatic conductivity. These additives, however, tend to increase the heat-seal temperature and increase the water vapour permeability of the coating.

Thus, hitherto, the formulation of a vinylidene chloride copolymer coating composition has been a compromise between the desired properties of low water vapour permeability, optimum heat-seal temperature and good machinability of the coated material.

The "heat-seal temperature" of a coating is defined as the lowest temperature applied by heat-sealing means to two superposed sheets coated on the inner surfaces with the coating composition sufficient to cause the coatings to fuse together under a pressure of 14 pounds per square inch applied for 2 seconds to produce a bond between the sheets which, at ambient temperature has a strength of 100 grams per 1½ inches width.

The heat-seal temperature of a coating should not be lower than about 80° C., or otherwise blocking difficulties are experienced when the coated film is wound into a roll, or above about 130° C., when difficulties are experienced in obtaining satisfactory heat-seals particularly when using high speed packaging machinery. Preferably, the heat-seal temperature of a coating lies within the range between 85° and 110° C.

The "water vapour permeability" of a coated material is the weight of water vapour in grams transmitted through a square metre of material in 24 hours at a temperature of 38° C. (±0.5° C.) with one side of the material exposed to an atmosphere dried by a dessicant and the other side exposed to an atmosphere of a relative humidity of 90% (±2%).

The present invention is concerned with a coated sheet material having low water-vapour permeability together with a desirable heat-seal temperature.

According to the present invention, a heat-sealable moistureproof sheet material comprises a flexible base sheet coated on each side with a sub-coating overlain with a top coating, the sub-coating consisting substantially of a vinylidene chloride copolymer having a vinylidene chloride content within the range between 93 and 96% by weight and having a sum total weight of coating on both sides of the base sheet within the range between 2.0 and 10.0 grams per square metre and the top coating comprising a vinylidene chloride copolymer having a vinylidene chloride content within the range between 80 and 92% by weight and having a sum total weight of top coating on both sides of the base sheet within the range between 1.0 and 5.0 grams per square metre.

The sub-coating confers substantially the major portion of low water vapour permeability to the sheet material while the top coating confers optimum heat-sealability.

Ahe the sub-coating consists substantially of a vinylidene chloride copolymer, that is, it is a vinylidene chloride copolymer which is substantially free of additives which would otherwise tend to increase water vapour permeability, the barrier to water vapour conferred upon the sheet material is at a maximum for the vinylidene chloride copolymer employed.

When the vinylidene chloride content of the top coating exceeds 92% the heat-seal temperature of the coating becomes too high to form heat-seals of suitable strength when formed by high speed packaging machinery. On the other hand, when the vinylidene chloride content of the top coating vinylidene chloride copolymer falls below about 80% by weight, the heat-seal temperature again increases undesirably. Preferably, the vinylidene chloride content in the vinylidene chloride copolymer forming the top coating lies in the range between 87% and 91% by weight when the most satisfactory combination of low heat-seal temperature and good anti-blocking properties are obtained.

The top coating may include as required surface effect additives to promote anti-blocking, slip and/or electrostatic conductivity that is, anti-blocking agents such as polyvinyl chloride, slip agents such as carnauba wax and anti-static agents such as surface active agents to promote electrostatic conductivity and to ensure ease in unwinding of the coated sheet material, smooth travel through packaging machinery and good release from heat-sealing jaws.

The sub-coating and the top coating are both preferably applied to the flexible base sheet as aqueous dispersions followed after each separate coating operation by a drying and heating stage to ensure coalescence of the copolymer particles. Alternatively, when there is a substantial difference (that is about five parts by weight) between the vinylidene chloride content of the copolymer forming the sub-coating and the copolymer forming the top coating, the sub-coating may be applied to the base sheet as an aqueous dispersion and after drying and heating, the top coating may then be applied over the sub-coating from a solution in a suitable volatile organic solvent, for example, a suitable mixture of methyl ethyl ketone and toluene in which the sub-coating is quite insoluble. The top coating is dried by heating.

It is not generally practicable to apply the sub-coating to the base sheet from a volatile organic solvent as vinylidene chloride copolymers of high vinylidene chloride content are either insoluble or dissolve only with difficulty in organic solvents.

When the sum total weight of the dry sub-coating on both sides of the sheet material (that is the dry coating weight) lies below about 2.0 grams per square metre the water vapour barrier properties are deleteriously affected and above about 10 grams per square metre a deterioration in transparency and brittleness tend to occur in the coating.

When the sum total weight of the dry top coating on both sides is below about 1.0 gram per square metre, the heat-seal strength becomes unreliable and when it is above about 5.0 grams per square metre no advantage is gained by the additional weight.

The vinylidene chloride copolymer in each coating comprises a copolymer of vinylidene chloride with one or more copolymerisable ethylenically unsaturated monomers such as methyl acrylate, methyl methacrylate, ethyl acrylate vinyl chloride, acrylonitrile with or without a small proportion, that is ½ to 3% by weight, of itaconic acid, or other ethylenically unsaturated acid such as acrylic or methacrylic acid.

The flexible base sheet may conveniently be a cellulosic film, for example, regenerated cellulose film or a film of a plastics material, for example, a polyolefinic film such as polypropylene. When the flexible base sheet is a cellulosic film it is preferred to pretreat the film with a conventional anchoring agent such as a melamine/formaldehyde or urea/formaldehyde resin. When the flexible base sheet is of a plastics material it is preferred to pretreat it by exposure to a suitable surface treating agent, for example, an electrostatic field, a flame or an oxidising agent to ensure good keying of the sub-coating to the plastics material. In addition a conventional anchoring coat, for example, a polyisocyanate, may also be applied before application of the sub-coating.

The two coatings may be applied in-line, that is each coating and drying operation is conducted sequentially without any intermediate wind-up. The sub-coatings may be applied to both side of the base sheet first, followed by the top coating or, alternatively, a sub-coating and a top coating may be applied to one side of the base sheet, followed by the application of a sub-coating and top coating to the other side of the base sheet. If, however, it is necessary to wind the sheet material into a roll between the application and drying of the sub-coat and the application of the top coat, it is preferred to employ for the sub-coating a vinylidene chloride copolymer having a vinylidene chloride content of at least 95% by weight to avoid blocking of the turns in the roll which would cause difficulties in unwinding for the application of the top coating.

The invention also includes a method for the manufacture of a heat-sealable moistureproof sheet material comprising coating a flexible base material on each side with an aqueous dispersion of a vinylidene chloride copolymer to provide on drying a sub-coating consisting substantially of a vinylidene chloride copolymer having a vinylidene chloride content within the range between 93 and 96% by weight, doctoring the coatings to provide on drying a sum total weight of coating on both sides of the base sheet within the range between 2.0 and 10.0 grams per square metre, drying the coatings, coating each sub-coating with a vinylidene chloride copolymer coating composition to provide on drying a top coating comprising a vinylidene chloride copolymer having a vinylidene chloride content within the range between 80 and 92% by weight, doctoring the coatings to provide on drying a sum total weight of top coating on both sides of the base sheet within the range between 1.0 and 5.0 grams per square metre and drying the top coatings.

The invention will now be further illustrated by the following examples:

EXAMPLE 1

A regenerated cellulose film 0.001 inch in thickness and pretreated with a melamine/formaldehyde anchoring resin was sub-coated on both sides with an aqueous dispersion of a vinylidene chloride copolymer containing 25% solids by weight formed by copolymerising 95 parts by weight of vinylidene chloride, five parts by weight of methyl methacrylate and one part by weight of itaconic acid in accordance with the method described in British patent specification No. 804,285.

The applied coating dispersions were suitably doctored with an air-knife to provide, after drying, a dry solids coating weight of 3.85 grams per square metre (sum total weight of coatings on both sides of the film). The drying of the applied coating dispersions after air-knife doctoring was carried out by subjection to infra-red heat, which in addition coalesced the copolymer particles to form smooth coatings.

Without rewinding, the cellulose film now coated with a dry sub-coating on both sides was coated on both sides with a top coating consisting of an aqueous dispersion of a vinylidene chloride copolymer containing 30% solids by weight formed by copolymerising 88 parts by weight of vinylidene chloride, 8 parts by weight of methyl methacrylate, 4 parts by weight of methyl acrylate and 1 part by weight of itaconic acid in accordance with the method described in British patent specification No. 804,285. The dispersion also contained 1.5% by weight of carnauba wax in emulsion form, 1.0% by weight of finely divided polyvinyl chloride to confer slip and anti-blocking properties to the dry coating, and 1.5% triethanolamine lauryl sulphate to confer anti-static properties and to facilitate good heat-seal jaw release.

The top coat dispersions were air-knife doctored to provide, after drying, dry solids weight of 1.9 grams per square metre (total weight of top coatings on both sides of the film). The drying was achieved by subjecting the doctored coating dispersions to infra-red heat which, in addition, coalesced the copolymer particles to form smooth coatings.

The coated film had good slip and anti-blocking properties, was readily machinable on converting machinery and had good heat-seal jaw release properties. The heat-seal temperature was 100° C. and the water vapour permeability (as hereinbefore defined) was 3.3 grams per square metre per 24 hours.

EXAMPLE 2

A regenerated cellulose film 0.001 inch in thickness and pretreated with a melamine/formaldehyde anchoring resin was sub-coated on both sides with a vinylidene chloride copolymer exactly as described in Example 1.

Without rewinding, the cellulose film now coated with a dry sub-coating on both sides was coated on both sides with a top coating consisting of an aqueous dispersion of a vinylidene chloride copolymer containing 30% solids by weight formed by copolymerising 84 parts by weight of vinylidene chloride, 8 parts by weight of methyl methacrylate and 8 parts by weight of methyl acrylate in accordance with the method described in British patent specification No. 804,285. The dispersion also contained in emulsion form, 3 parts by weight of carnauba wax, 2 parts by weight of finely divided polyvinyl chloride and 2 parts by weight of triethanolamine lauryl sulphate.

The top coat dispersions were each air-knife doctored to provide, after drying, a dry solids weight of 1.5 grams per square metre (sum total weight of top coatings on both sides of the film). The drying was achieved by subjecting the doctored coating dispersions to infra-red heat which, in addition, coalesced the copolymer particles to form smooth top coatings. The coated film had good slip and anti-blocking properties and was readily machinable on high speed converting machinery with good heat-seal jaw release properties. The heat-seal temperature was 107° C. and the water vapour permeability (as hereinbefore defined) was 3.2 grams per square metre per 24 hours.

The coated sheet material in accordance with the invention had, for a particular coating weight, a significantly lower water vapour permeability than the same coated material with a single coating on each side having such a composition that, when containing suitable additives to confer satisfactory machinability properties, would have a substantially identical heat-seal temperature.

Conversely, for a particular water vapour permeability value, a coated sheet in accordance with the invention has a lower coating weight than a single coated material coated on both sides with a composition which when containing suitable additives to confer satisfactory machinability properties would have a substantially identical heat-seal temperature.

We claim:

1. A heat-sealable moistureproof sheet material comprising a flexible base sheet coated on each side with a sub-coating overlain with a top coating, the sub-coating consisting essentially of a vinylidene chloride copolymer having a vinylidene chloride content within the range between 93 and 96% by weight and having a sum total weight of coating on both sides of the base sheet within the range between 2.0 and 10.0 grams per square metre and the top coating comprising a major proportion of a vinylidene chloride copolymer having a vinylidene chloride content within the range between 80 and 92% by weight and having a sum total weight of top coating on both sides of the base sheet within the range between 1.0 and 5.0 grams per square metre.

2. A heat-sealable moistureproof sheet material as claimed in claim 1 in which the vinylidene chloride content of the vinylidene chloride copolymer of the top coating is within the range between 87 and 91%.

3. A heat-sealable moistureproof sheet material as claimed in claim 1 in which the top coating includes at least one surface effect additive.

4. A heat-sealable moistureproof sheet material as claimed in claim 1 in which the vinylidene chloride copolymer in each coating is a copolymer of vinylidene chloride with one or more copolymerisable monomers selected from the group consisting of methyl acrylate, methyl methacrylate, ethyl acrylate, vinyl chloride and acrylonitrile.

5. A heat-sealable moistureproof sheet material as claimed in claim 4 in which the vinylidene chloride copolymer also includes ½ to 3% by weight of an ethylenically unsaturated acid selected from the group consisting of itaconic acid, acrylic acid and methacrylic acid.

6. A heat-sealable moistureproof sheet material as claimed in claim 1 in which the flexible base sheet is regenerated cellulose film.

7. A heat-sealable moistureproof sheet material as claimed in claim 1 in which the flexible base sheet is a synthetic resin film.

8. A heat-sealable moistureproof sheet material as claimed in claim 1 in which the sub-coating consists essentially of a vinylidene chloride copolymer formed by copolymersing 95 parts by weight of vinylidene chloride, 5 parts by weight of methyl methacrylate and one part by weight of itaconic acid and the top coating comprises a major proportion of a vinylidene chloride copolymer formed by copolymerising 88 parts by weight of vinylidene chloride, 8 parts by weight of methyl methacrylate, 4 parts by weight of methyl acrylate and 1 part by weight of itaconic acid.

9. A heat-sealable moistureproof sheet material as claimed in claim 1 in which the sub-coating consists essentially of a vinylidene chloride copolymer formed by copolymerising 95 parts by weight of vinylidene chloride, 5 parts by weight of methyl methacrylate and one part by weight of itaconic acid and the top coating comprises a major proportion of a vinylidene chloride copolymer formed by copolymerizing 84 parts by weight of vinylidene chloride, 8 parts by weight of methyl methacrylate and 8 parts by weight of methyl acrylate.

References Cited

UNITED STATES PATENTS

| | | | |
|---|---|---|---|
| 2,961,342 | 11/1960 | Snyder | 117—68 X |
| 3,161,532 | 12/1964 | Sill | 117—68 |
| 2,829,068 | 4/1958 | Stewart | 117—76 |
| 2,819,984 | 1/1958 | Ackerman | 117—76 |
| 3,320,086 | 5/1967 | Rose et al. | 117—68 |
| 2,570,478 | 10/1951 | Pitzl | 117—76 OX |
| 3,532,535 | 10/1970 | Bleyle et al. | 117—68 |
| 2,618,575 | 11/1952 | Oswin | 117—68 |

FOREIGN PATENTS

| | | | |
|---|---|---|---|
| 752,807 | 2/1967 | Canada | 117—68 |
| 804,285 | 11/1958 | Great Britain | 117—145 |

WILLIAM D. MARTIN, Primary Examiner

M. R. LUSIGNAN, Assistant Examiner

U.S. Cl. X.R.

117—76 F